United States Patent [19]

Fugate et al.

[11] 4,369,484
[45] Jan. 18, 1983

[54] MULTIPLE METER SWITCHBOARD

[75] Inventors: Robert L. Fugate, Cleveland; Richard Schneider, Mayfield Heights; Felix K. Zgud, Lyndhurst, all of Ohio

[73] Assignee: GTE Products Corporation, Stamford, Conn.

[21] Appl. No.: 246,495

[22] Filed: Mar. 23, 1981

[51] Int. Cl.³ .............................................. H02B 1/04
[52] U.S. Cl. .................................. 361/334; 361/365; 361/363; 361/390
[58] Field of Search ............... 361/334, 338, 339, 341, 361/342, 356, 358, 363, 365, 367, 364, 390, 391

[56] References Cited

U.S. PATENT DOCUMENTS 3,746,936  7/1973  Coffey et al. ................... 361/356
4,180,845  12/1979  Shariff et al. ................... 361/334

*Primary Examiner*—G. P. Tolin
*Attorney, Agent, or Firm*—David M. Keay

[57] ABSTRACT

Multiple meter electrical switchboard apparatus having a plurality of service sections, each including a meter compartment and an adjacent switching compartment. A meter socket and watt-hour meter are mounted in each meter compartment. A switching mechanism and circuit protective devices, such as fuses or circuit breakers, are mounted in each switching compartment. Busbars carrying incoming power are electrically connected to the components in each service section, and each service section has load terminals for making connections to a sub-feed or branch circuit. The apparatus has vertical and horizontal wireways for accommodating cables connected to the load terminals. Each compartment is accessible only through the open front of the apparatus and each is individually covered by a closure member.

10 Claims, 4 Drawing Figures

MULTIPLE METER SWITCHBOARD

BACKGROUND OF THE INVENTION

This invention relates to multiple meter electrical switchboards. More particularly, it is concerned with an assembly of meters, switches, and circuit protective devices in an enclosure for distributing metered electrical service to a plurality of sub-feed or branch circuits.

It is common practice to meter individual electrical power consumption in multiple tenant residential and commercial buildings. It is desirable that the individual single phase, two phase, or three phase sub-feed or branch circuits be controlled and metered at a common service entrance where they can be connected and disconnected together and/or individually from the incoming power lines. A multiple meter electric switchboard is frequently employed for this purpose. It is desirable that the multiple meter electrical switchboard at the service entrance be capable of being prewired at a manufacturing facility in accordance with any specific requirements prior to installation in the field at the site where it is to be used. At the field site connections are made to incoming power lines and to the individual sub-feed or branch circuit distribution panelboards, thus saving "on site" assembly time and greatly reducing the possibility of improper combinations of components.

SUMMARY OF THE INVENTION

An improved multiple meter electric switchboard assembly in accordance with the present invention comprises an enclosure having side walls and an open front. The assembly also includes horizontally extending busbars for incoming power. A plurality of vertically arranged service sections are provided within the enclosure. Each service section includes a meter compartment comprising a vertical rear mounting panel, a barrier side wall parallel to and spaced from one of the side walls of the enclosure, a top wall extending horizontally from the other of the side walls of the enclosure to the barrier side wall and from the rear mounting panel to the open front of the enclosure, and a bottom wall spaced from the top wall and extending horizontally from the other of the side walls of the enclosure to the barrier side wall and from the rear mounting panel to the open front of the enclosure.

Each service section also includes a switching compartment vertically adjacent to the meter compartment. The switching compartment comprises a vertical rear mounting panel which is generally aligned with the rear mounting panel of the meter compartment, a barrier side wall parallel to and spaced from the one of the side walls of the enclosure and generally aligned with the barrier side wall of the meter compartment, a top wall extending horizontally from the other of the side walls of the enclosure to the barrier side wall and from the rear mounting panel to the open front of the enclosure, and a bottom wall spaced from the top wall and extending horizontally from the other of the side walls of the enclosure to the barrier side wall and from the rear mounting panel to the open front of the enclosure.

A meter socket is mounted within each meter compartment on the rear mounting panel thereof and is adapted for mounting a meter thereon. A switching mechanism and circuit protective means are mounted within each switching compartment on the rear mounting panel thereof. Line terminals and load terminals are mounted within each service section. Electrical conductors which are connected to the busbars extend vertically behind the rear mounting panels and are connected to the line terminals of each service section. Electrical conductors within each service section connect the associated meter socket, switching mechanism, and circuit protective means in series between the line terminals and the load terminals. Each of the switching mechanisms is switchable between an activated condition which produces a closed circuit between the associated line and load terminals and a deactivated condition which produces an open circuit between the associated line and load terminals.

The one side wall of the enclosure and the barrier side walls define a vertical wireway between them which extends alongside the plurality of vertically arranged service sections. Access means in the barrier side walls permit access between the load terminals of each service section and the vertical wireway.

An openable front closure member is provided for closing the open front of each meter compartment to prevent manual access thereto while permitting a meter mounted in the meter socket to be read. An openable front closure member is provided for closing the open front of each switching compartment to prevent manual access thereto, and an openable front closure member is provided for closing the open front of the vertical wireway to prevent manual access thereto.

For a better understanding of the present invention, together with other and further objects, advantages, and capabilities thereof, reference is made to the following discussion and appended claims in connection with the above-described drawings.

DETAILED DESCRIPTION OF THE INVENTION

Figure 1:
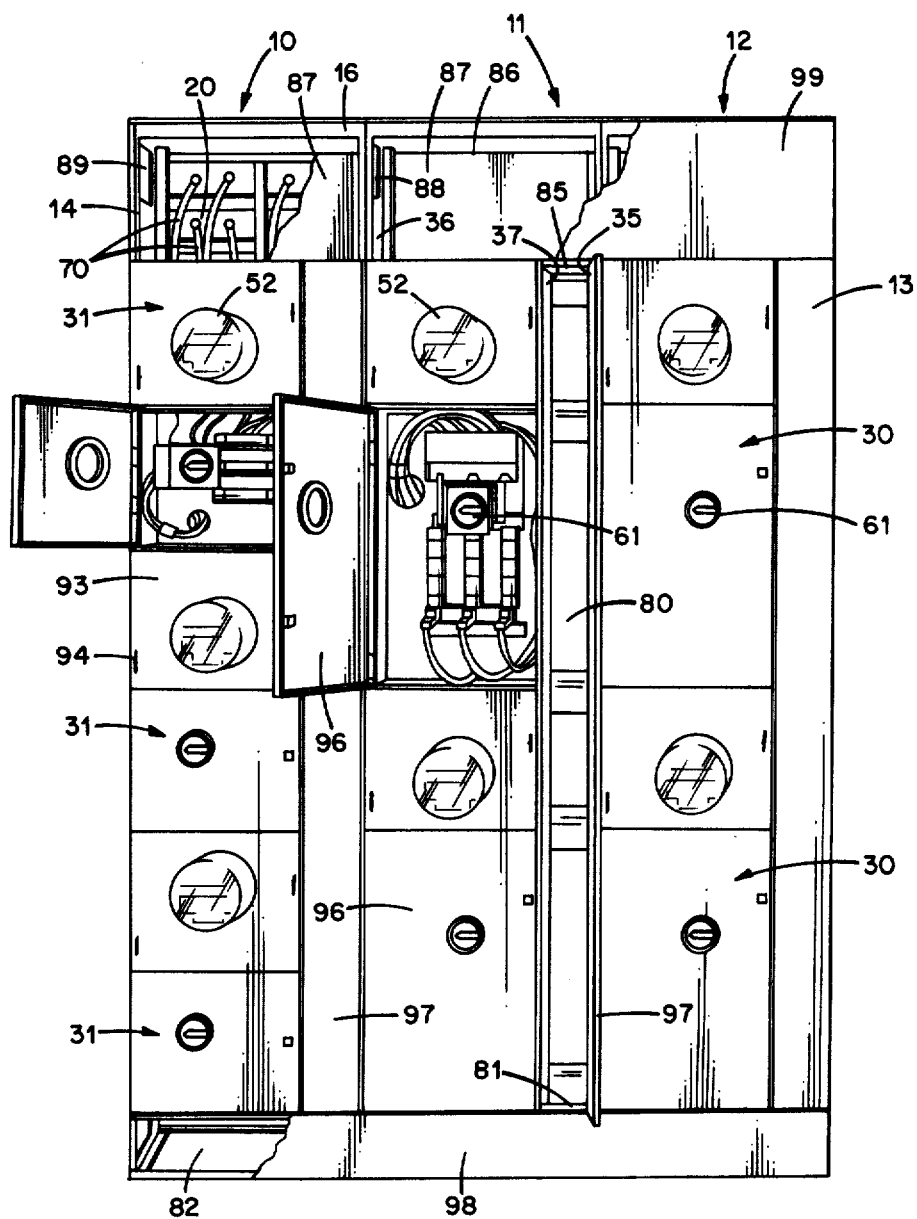
FIG. 1 is a perspective view with portions broken away of a multiple meter switchboard apparatus in accordance with the present invention.

FIG. 1 illustrates three multiple meter electric switchboard assemblies 10, 11, and 12 in accordance with the present invention arranged side-by-side within a single cabinet 13. The cabinet has two vertical side walls 14, a horizontal top wall 16, and an open bottom. The back of the cabinet may be closed by a wall, or the cabinet may contain two sets of three assemblies each arranged back-to-back and using common busbars. The front of the cabinet is open and portions are individually and selectively closed by closure members as will be explained hereinbelow. Busbars 20, which are shown in more detail in FIG. 3, for conducting incoming power are located in the upper portions of each assembly and extend horizontally across the cabinet. A neutral bus (when provided) and a ground bus (when provided) are located in the lower portions of each assembly and extend horizontally across the cabinet. Openings (not shown) in the side walls 14 of the cabinet provide for extension of the busbars to a service entrance switch or circuit breaker. Each assembly contains vertically arranged service sections, each providing for controlling and metering an individual sub-feed or branch load circuit. Because of the different sizes of the electrical components employed for different power requirements, an assembly may contain either two 200 ampere service sections 30 or three 100 ampere service sections 31.

Each switchboard assembly in the cabinet comprises an enclosure having two side walls, one of which may be a side wall of the cabinet 13. In the center assembly 11, a first side wall 35 includes a panel suitably attached to supporting members and extending part way into the enclosure from the open front (see FIGS. 2 and 3). This panel also provides a side wall of the adjacent assembly 12. A second side wall 36 including a similarly mounted panel serves as a side wall of the other adjacent assembly 10. A barrier side wall 37 which also extends part way from the open front into the enclosure is spaced from the first side wall 35.

Each service section 30 in the center assembly 11 includes a meter compartment 40 and a switching compartment. As shown in detail in FIG. 2, each meter compartment 40 is arranged vertically above its associated switching compartment 41. Each meter compartment 40 is formed by the barrier side wall 37, the second side wall 36 of the enclosure, a top wall 45, and a bottom wall 46. The back of the meter compartment is closed by a rear mounting panel 47. The associated switching compartment 41 is formed by the barrier side wall 37, the second side wall 36 of the enclosure, a bottom wall 48, and the bottom wall 46 of the meter compartment which constitutes a top wall. The back of the switching compartment is closed by a rear mounting panel 49 which is generally aligned with the rear mounting panel 47 of the meter compartment. Thus, each meter compartment and each switching compartment is a distinct, isolated compartment closed on five sides and having an open front at the open front of the enclosure.

A meter socket 51 is mounted within the meter compartment 40 on the rear mounting panel 47. The meter socket 51 is of conventional type and is adapted for receiving a standard watt-hour meter 52. The meter socket 51 may include a conventional bypass arrangement operated by a handle 53 to bypass the meter 52 and permit removal of the meter from the socket without interrupting the electrical service to the sub-feed or branch circuit.

A switching mechanism 60 is mounted within the switching compartment on the rear mounting panel 49. The handle 61 of the switching mechanism 60 is movable between two positions to activate or deactivate the switching mechanism and provide a closed or an open circuit therethrough. Also mounted on the rear panel within the switching compartment are fuse holders 65 for supporting fuses 66 to provide overcurrent protection for the sub-feed or branch circuit. The switching mechanism 60 may include a circuit breaker mechanism to provide both switching and circuit protection within a single component. Fuses may or may not be used for additional circuit protection when the switching mechanism is also a circuit breaker.

Figure 3:
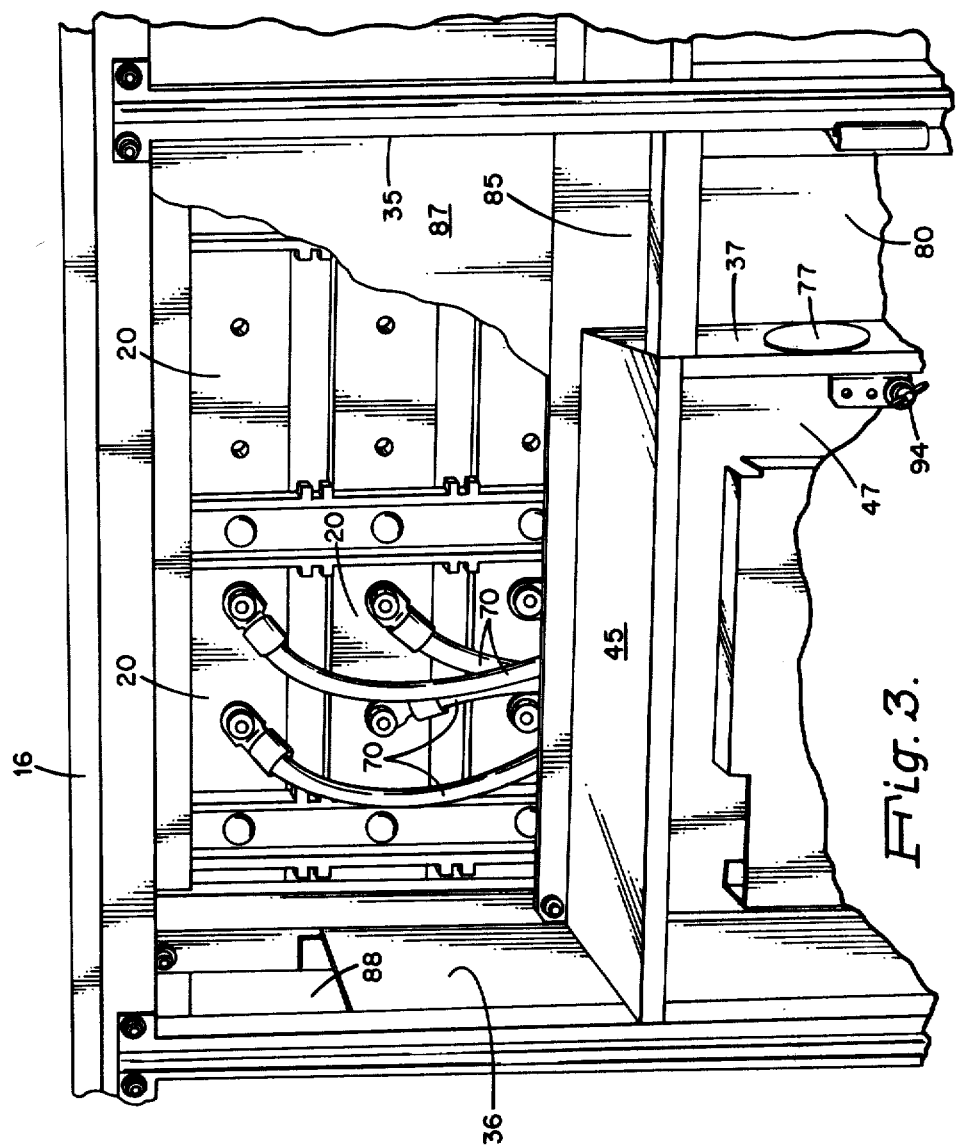
FIG. 3 is a perspective view of a portion of the apparatus of FIG. 1 showing details of certain components.

Electrical power is conducted to each service section 30 of the assembly from the horizontal busbars 20 by vertical conductors. As shown the vertical conductors are wire cables 70, but vertical busbars may be employed. When vertical busbars are used, connections for taking off power may be by stab connectors, plug-in connectors, or by bolted connections. The horizontal busbars 20 which are located in the portion of the enclosure above the level of the top wall 45 of the uppermost meter compartment are positioned behind the vertical plane of the rear mounting panels 47 and 49, as best seen in FIG. 3. Thus, the vertical conductors 70 readily pass behind the rear mounting panels. One set of conductor 70 passes through an opening 69 in the rear mounting panel of each switching section and is connected to line terminals 71 on the switching mechanism 60. The fuse holders 65 are connected at one end directly to the switching mechanism 60. Conductors 72 connected to terminals 67 at the other end of each fuse holder pass through openings 73 in the intermediate wall 46 and are connected to terminals 74 on the associated meter socket in the adjacent meter compartment. The other set of terminals on the meter socket are the load terminals 75 for the service section. The arrangement illustrated is for a 3 phase, 4 wire load.

The barrier side wall 37 contains knockouts 77 which may be removed as needed to provide passage for electrical cables (not shown) which would be installed at the site to connect terminals 80 to a branch circuit panelboard. Cables can pass through the wall into the vertical wireway 80 provided by the space between the side wall 35 and the barrier side wall 37. The vertical wireway extends for the total height of the service sections of the assembly. An opening 81 at the bottom of the vertical wireway provides access to a horizontal wireway 82 extending across the cabinet beneath the bottom walls of the lowermost switching compartments and through openings at the vertical side walls. An opening 85 at the top wall of the vertical wireway 80 provides access to an upper horizontal wireway 86 extending across the cabinet between the top walls 45 of the uppermost meter compartments and the top wall 16 of the cabinet. The upper horizontal wireway 86 is isolated from the horizontal busbars 20 by a vertical separating wall 87, preferably of insulating material, in the plane of the rear mounting panels 47 and 49. Openings 88 and 89 at the side walls permit passage through and externally of the cabinet. Cabinet sections and busbars may be electrically and mechanically joined in the field for juxtaposition.

The open front of each meter compartment is closed by a removable cover 93 having an opening for accommodating a standard watt-hour meter 52 when a meter is placed in the meter socket 51. The location of the meter socket is such that the bypass handle 53 prevents placing the cover 93 in position over the open front except when the meter is connected in the circuit and is not being bypassed. The cover 93 is held in place by fastenings 94 which may be sealed to prevent undetected tampering. Thus, each meter compartment is closed off and sealed preventing manual access thereto while permitting the meter to be read. The open front of each switching compartment is closed by a hinged cover 96. The cover or door, has an opening which accommodates the handle 61 of the switching mechanism 60. Thus, when the door is closed and locked, if desired, the switching mechanism can still be actuated without permitting access to the interior of the compartment. The open front of each vertical wireway 80 is closed by a hinged cover or door 97. The lower and upper horizontal wireways 82 and 86 are covered by removable panels 98 and 99, respectively, which extend across the front of the cabinet.

Figure 2:
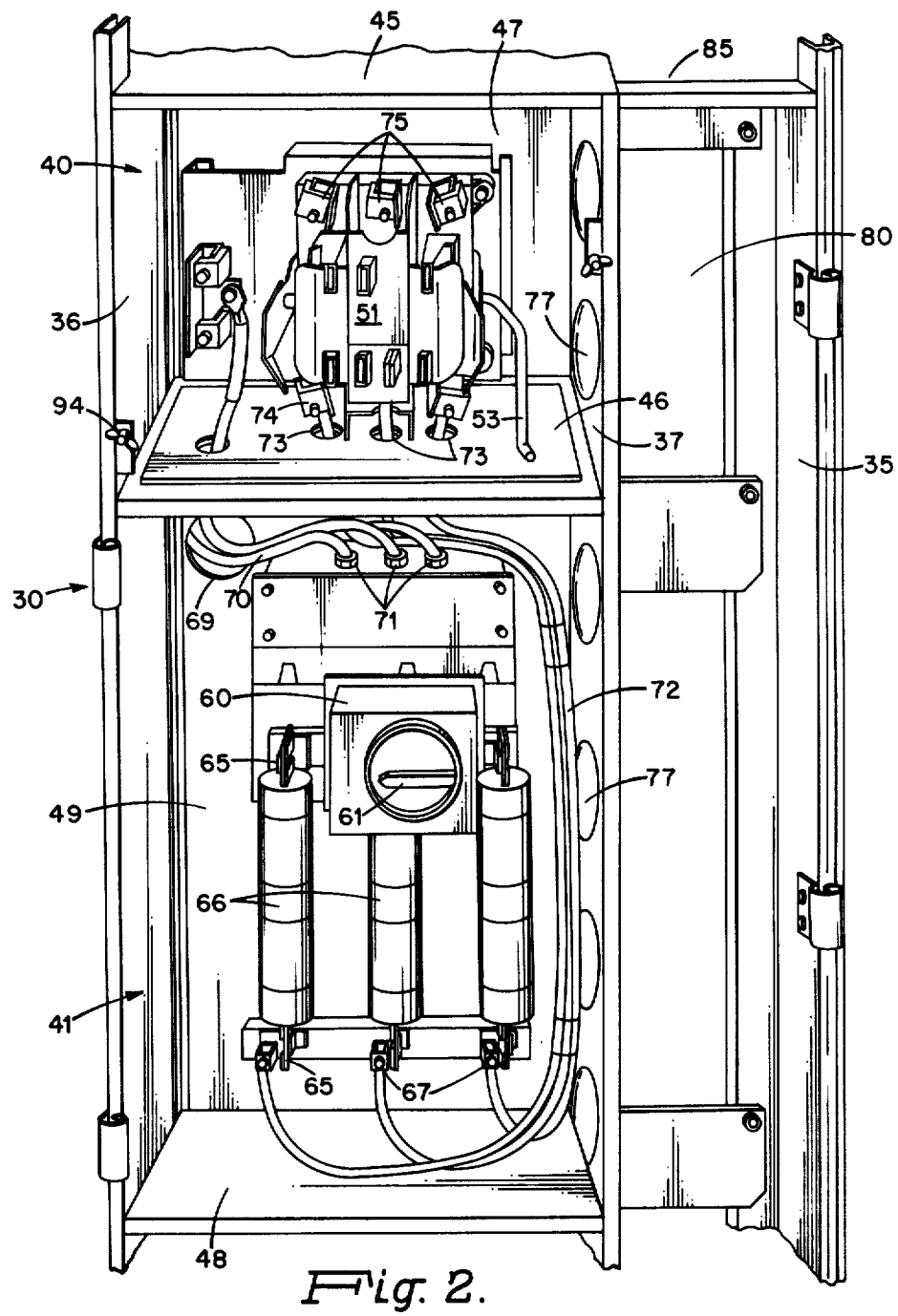
FIG. 2 is a perspective view showing a service section of the apparatus of FIG. 1.
Figure 4:
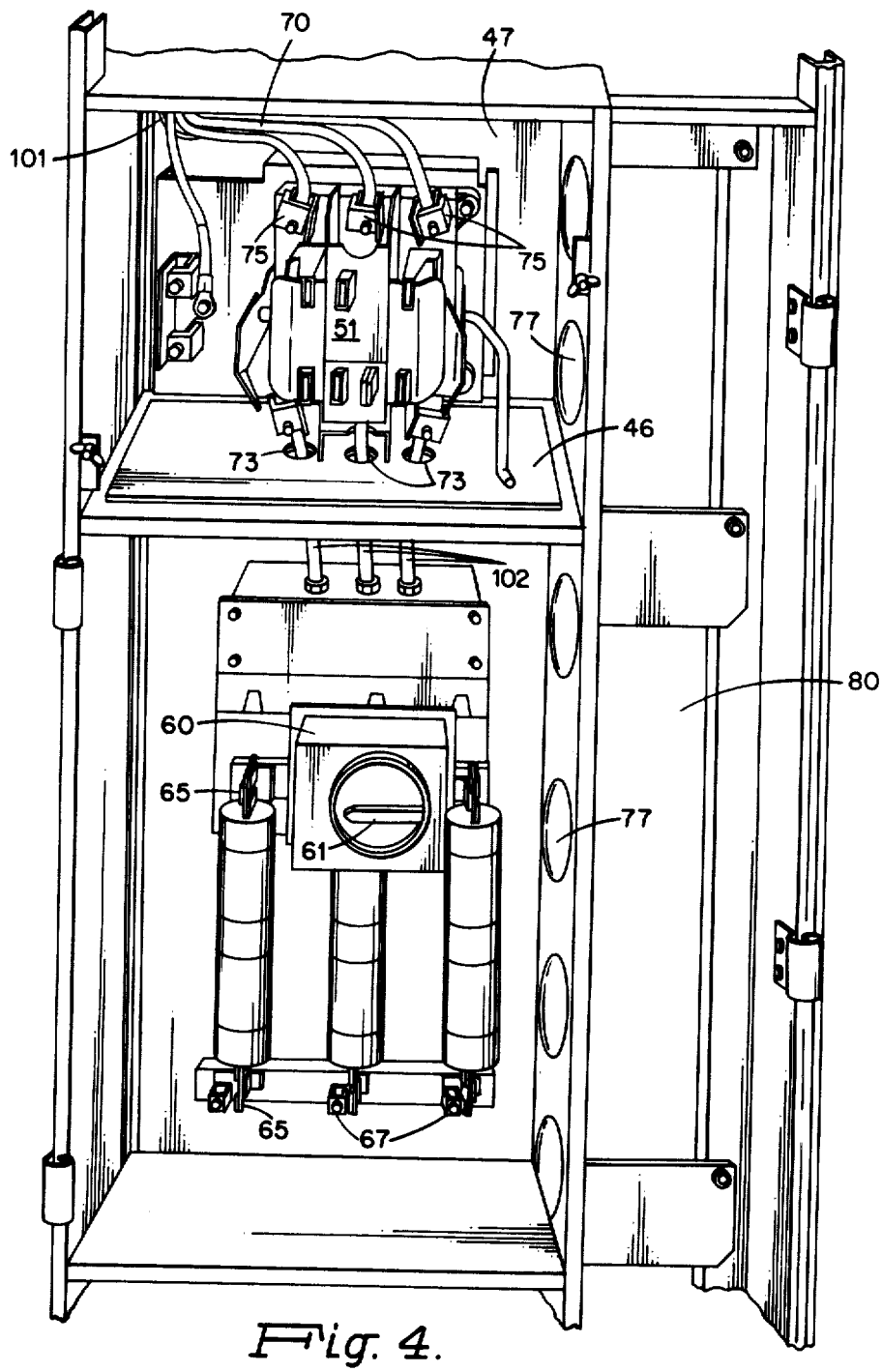
FIG. 4 is a perspective view similar to FIG. 2 showing a modified service section.

The series arrangement of meter socket, switching mechanism, and fuses within each service section as shown in FIGS. 1-3 and as described hereinabove provides a so-called "cold" metered circuit. Under operating conditions with this arrangement when the switching mechanism is in the open condition, power is not being applied to the meter. A common alternative arrangement providing a so-called "hot" metered circuit is illustrated by the service section shown in FIG. 4. The meter socket terminals 75 are the line terminals of the service section, and the power cables 70 from the horizontal busbars pass through an opening 101 in the rear mounting panel 47 of the meter compartment and are connected to the line terminals 75. Cables 102 connected to the meter socket 51 pass through openings 73 in the intermediate wall 46 between the two compartments and are connected to the switching mechanism 60. The terminals 67 at the opposite end of the fuse holders 65 are the load terminals of the service section. Access between the load terminals 67 and the vertical wireway 80 is provided by knockouts 77 in the barrier side wall. With this arrangement power is always being applied to the meter regardless of whether the switching mechanism is in the open or closed condition.

The meter compartment and switching compartments as shown provide a modular arrangement of service sections. In one specific embodiment the vertical height of each meter compartment is one foot. The vertical height of each of the switching compartments is either one foot or two feet, depending upon the size required to accommodate the components used. Thus, an enclosure having six feet of vertical height between the lower and upper horizontal wireways contains either two or three service stations.

Multiple meter electrical switchboard apparatus as described provides both metering and switching capability for a plurality of sub-feed or branch circuits in a single unit. The metering equipment and the switching equipment for each sub-feed or branch circuit are located together, thereby reducing the possibility of working on a circuit by mistake when it has not been de-energized. The apparatus is pre-assembled and pre-wired for easy, economical installation at the field site. Since the combination of components in a switchboard unit is established at the manufacturing facility rather than at the field site, there is greater assurance that the components are properly selected and coordinated. At the field site the busbars are connected to incoming power lines and the load terminals of each service center are connected to the distribution panel for each branch circuit. Switchboards may be connected together in multiple arrangements at the field site as required. No interconnections within the apparatus are necessary. Adequate, unobstructed wireways are provided to accommodate wiring from the service sections to the branch load circuits. Restricted access which is individually and selectively controlled is provided to each of the various compartments and wireways. The apparatus is versatile permitting the use of components of various size and various internal wiring arrangements as required for particular installations.

While there has been shown and described what are considered preferred embodiments of the present invention, it will be obvious to those skilled in the art that various changes and modifications may be made therein without departing from the invention as defined by the appended claims.

What is claimed is:

1. A multiple meter electric switchboard assembly comprising
   an enclosure having side walls and an open front;
   horizontally extending busbars;
   a plurality of vertically arranged service sections within the enclosure;
   each service section including a meter compartment comprising
      a vertical rear mounting panel,
      a barrier side wall parallel to and spaced from one of the side walls of the enclosure,
      a top wall extending horizontally from the other of said side walls of the enclosure to the barrier side wall and from the rear mounting panel to the open front of the enclosure and
      a bottom wall spaced from the top wall and extending horizontally from said other of the side walls of the enclosure to the barrier side wall and from the rear mounting panel to the open front of the enclosure;
   each service section including a switching compartment vertically adjacent to the meter compartment, the switching compartment comprising
      a vertical rear mounting panel generally aligned with the rear mounting panel of the meter compartment,
      a barrier side wall parallel to and spaced from said one of the side walls of the enclosure and generally aligned with the barrier side wall of the meter compartment,
      a top wall extending horizontally from said other of the side walls of the enclosure to the barrier side wall and from the rear mounting panel to the open front of the enclosure, and
      a bottom wall spaced from the top wall and extending horizontally from said other of the side walls of the enclosure to the barrier side wall and from the rear mounting panel to the open front of the enclosure;
   a meter socket mounted within each meter compartment on the rear mounting panel thereof and adapted for mounting a meter thereon;
   a switching mechanism mounted within each switching compartment on the rear mounting panel thereof;
   circuit protective means mounted within each switching compartment on the rear mounting panel thereof;
   line terminals and load terminals mounted within each service section;
   electrical conductors connected to said busbars and extending vertically behind the rear mounting panels, said conductors being connected to the line terminals of each service section;
   electrical conductors within each service section connecting the meter socket, switching mechanism, and circuit protective means mounted therein in series between the line terminals and load terminals thereof;
   each switching mechanism being switchable between an activated condition producing a closed circuit between the line and load terminals of the associated service section and a deactivated condition producing an open circuit between the line and load terminals of the associated service section;
   said one side wall of the enclosure and said barrier side walls defining a vertical wireway therebetween extending alongside the plurality of vertically arranged service sections;

access means in the barrier side walls for permitting access between the load terminals of each service section and the vertical wireway;

an openable front closure member for closing the open front of each meter compartment to prevent manual access thereto while permitting a meter mounted in the meter socket to be read;

an openable front closure member for closing the open front of each switching compartment to prevent manual access thereto; and an openable front closure member for closing the open front of the vertical wireway to prevent manual access thereto.

2. A multiple meter electric switchboard assembly in accordance with claim 1 wherein the meter compartment of each service section is located directly above the associated switching compartment;

a horizontal separating wall between each meter compartment and the associated switching compartment provides the bottom wall of the meter compartment and the top wall of the switching compartment; and said electrical conductors within each service section connecting the meter socket, switching mechanism, and circuit protective means passes through openings in said horizontal separating wall.

3. A multiple meter electric switchboard assembly in accordance with claim 3 including a top wall of said enclosure spaced from the top wall of the meter compartment of the uppermost service section; and a vertical separating wall lying generally in the plane of the rear mounting panels extending from said one of the side walls of the enclosure to said other of the side walls of the enclosure and from the top wall of the meter compartment of the uppermost service section to the top wall of the enclosure;

said horizontally extending busbars being located in the space between the top wall of the enclosure and the plane of the top wall of the meter compartment of the uppermost service section and behind the vertical separating wall.

4. A multiple meter electric switchboard assembly in accordance with claim 2 including openings in said side walls of the enclosure between the top wall of the enclosure and the top wall of the meter compartment of the uppermost service section and between the vertical separating wall and the open front of the enclosure providing an upper horizontal wireway;

an opening between said vertical wireway and said upper horizontal wireway to permit the passage of electrical wiring therebetween; and an openable front closure member for closing the open front of the upper horizontal wireway.

5. A multiple meter electric switchboard assembly in accordance with claim 4 including a lower horizontal wireway below the bottom wall of the switching compartment of the lowermost service section;

an opening between said vertical wireway and said lower horizontal wireway to permit the passage of electrical wiring therebetween; and an openable front closure member for closing the open front of the lower horizontal wireway.

6. A multiple meter electric switchboard assembly in accordance with claim 5 wherein each switching mechanism includes a handle manually movable between a first position in which the switching mechanism is in the activated condition and a second position in which the switching mechanism is in the deactivated condition; and each of said openable front closure members for closing the open front of a switching compartment to prevent manual access thereto contains an opening for accommodating the handle of the associated switching mechanism to permit movement of the handle between the first and second positions when the closure member is in position closing the open front of the switching compartment.

7. A multiple meter electric switchboard assembly in accordance with claim 6 wherein said line terminals of each service section are located within the associated switching compartment and are connected directly to the associated switching mechanism;

the rear mounting panel of each switching compartment contains an opening therethrough for permitting passage of the electrical conductors from the busbars to the associated line terminals;

said load terminals of each service section are located within the associated meter compartment and are connected directly to the associated meter socket; and access means are provided in the barrier side wall of each meter compartment for permitting access between the associated load terminals and the vertical wireway.

8. A multiple meter electric switchboard assembly in accordance with claim 6 wherein said line terminals of each service section are located within the associated meter compartment and are connected directly to the associated meter socket;

the rear mounting panel of each meter compartment contains an opening therethrough for permitting passage of the electrical conductors from the busbars to the associated line terminals;

said load terminals of each service section are located within the associated switching compartment and are connected directly to the associated switching mechanism; and access means are provided in the barrier side wall of each switching compartment for permitting access between the associated load terminals and the vertical wireway.

9. A multiple meter electric switchboard assembly in accordance with claim 6 wherein the vertical heights of the meter compartments between the top and bottom walls thereof are equal; and the vertical heights of the switching compartments between the top and bottom walls thereof are each equal to N times the vertical height of a meter compartment, where N is 1 or 2.

10. An arrangement including several multiple meter electric switchboard assemblies in accordance with claim 6 in side-by-side relationship wherein said one side wall of the enclosure of one assembly coincides with said other side wall of the enclosure of the adjacent assembly to provide an intermediate side wall;

and including openings in said intermediate side walls between the top walls of the enclosures and the plane of the top walls of the meter compartments of the uppermost service sections and behind said vertical separating walls;

horizontal busbars extending through said openings in said intermediate side walls across all the assemblies of the arrangement; and openings in said intermediate side walls between the top walls of the enclosures and the top walls of the meter compartments of the uppermost service sections and between said vertical separating walls and the open fronts of the enclosures to provide an upper horizontal wireway across all the assemblies of the arrangement.

* * * * *